United States Patent

Tamegai et al.

(10) Patent No.: US 6,651,450 B1
(45) Date of Patent: Nov. 25, 2003

(54) DRIVE CONTROL DEVICE FOR HYBRID COMPRESSOR

(75) Inventors: Masahiko Tamegai, Konan (JP); Kazuhiro Irie, Konan (JP)

(73) Assignee: Zexel Valeo Climate Control Corporation, Saitama (JP)

(*) Notice: Subject to any disclaimer, the term of this patent is extended or adjusted under 35 U.S.C. 154(b) by 113 days.

(21) Appl. No.: 10/069,014

(22) PCT Filed: Sep. 12, 2000

(86) PCT No.: PCT/JP00/06217

§ 371 (c)(1),
(2), (4) Date: Feb. 20, 2002

(87) PCT Pub. No.: WO01/23727

PCT Pub. Date: Apr. 5, 2001

(30) Foreign Application Priority Data

Sep. 28, 1999 (JP) .......................................... 11/273782

(51) Int. Cl.[7] ............................. F25B 27/00; B60H 1/32
(52) U.S. Cl. ............................. 62/133; 62/134; 62/230; 62/236; 62/241; 62/323.3
(58) Field of Search .......................... 62/133, 134, 230, 62/236, 241, 323.3, 126; 417/15, 434

(56) References Cited

U.S. PATENT DOCUMENTS

| 5,275,011 | A | | 1/1994 | Hanson et al. ................. 62/157 |
| 6,351,957 | B2 | * | 3/2002 | Hara ............................. 62/133 |
| 6,381,971 | B2 | * | 5/2002 | Honda .......................... 62/126 |
| 2002/0194858 | A1 | * | 12/2002 | Mohrmann et al. ........... 62/236 |
| 2003/0041603 | A1 | * | 3/2003 | Tada et al. .................... 62/134 |
| 2003/0140643 | A1 | * | 7/2003 | Yoshimura ................... 62/186 |

FOREIGN PATENT DOCUMENTS

| JP | 9-324668 | 12/1997 |
| JP | 10-236151 | 9/1998 |
| JP | 2000-205122 | 7/2000 |

* cited by examiner

Primary Examiner—Marc Norman
(74) Attorney, Agent, or Firm—Wenderoth, Lind & Ponack, L.L.P.

(57) ABSTRACT

If a motor breaks down, an appropriate measure is taken according to the type pf the breakdown. If the breakdown is judged to be due to abnormal energization of the motor by electrical abnormality judgment means, a drive source for a hybrid compressor is secured while preventing an engine for traveling from stopping by compressor operation continuation means. If it is judged that the driven state of the motor is abnormal, the hybrid compressor is disconnected from the engine to protect the engine from mechanical abnormality of the hybrid compressor.

7 Claims, 2 Drawing Sheets

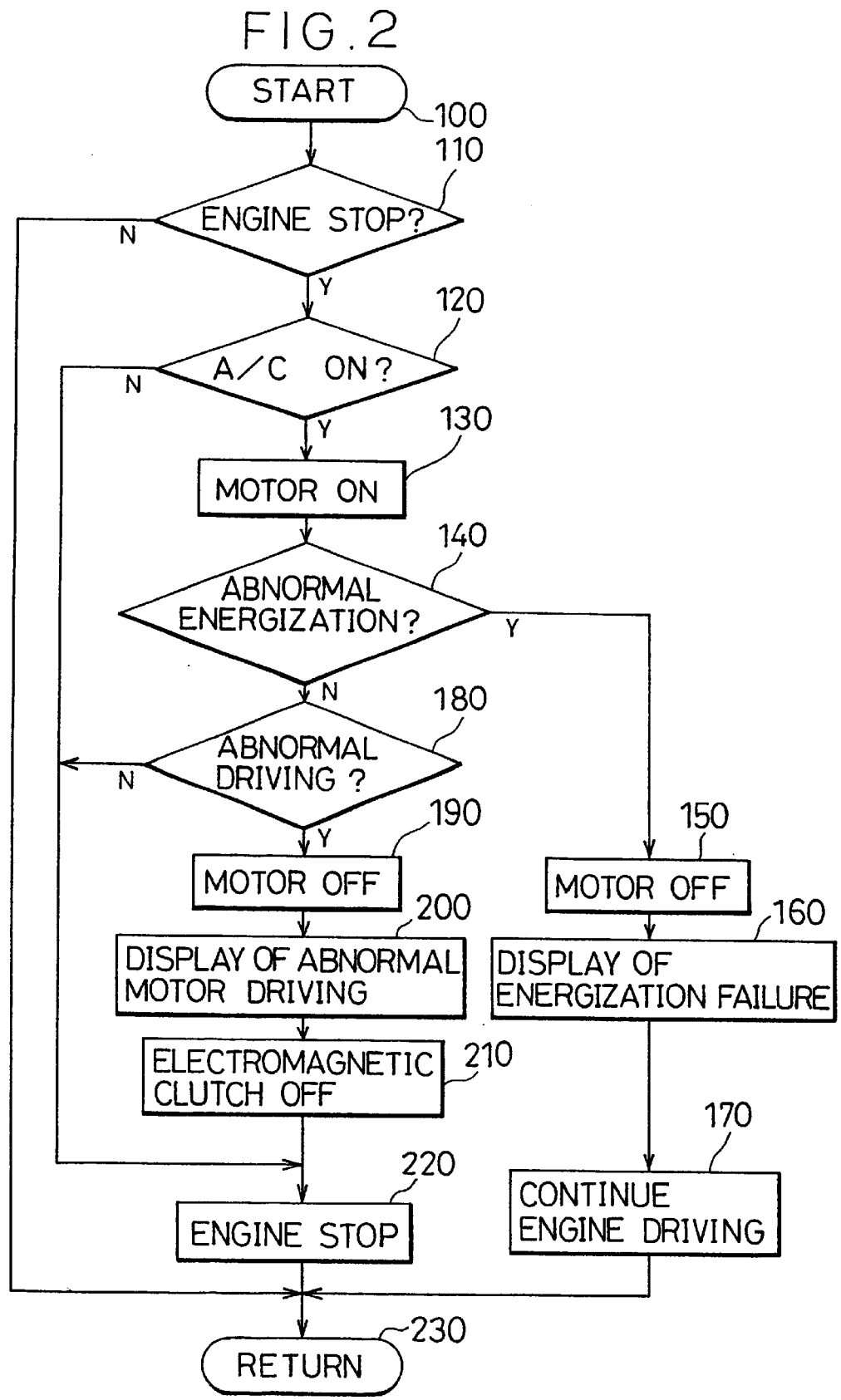

DRIVE CONTROL DEVICE FOR HYBRID COMPRESSOR

TECHNICAL FIELD

The present invention relates to a drive control device for a hybrid compressor that constitutes part of a refrigerating cycle of an air-conditioning system installed in a hybrid car, an idle-stop car, an electric car or the like and includes two drive sources, i.e., an engine for traveling and a motor.

In an operation control device for a car compressor disclosed in Japanese Unexamined Patent Publication No. H 9-324668, a rotor provided for power generation can be switched to function as an electric motor by an inverter. The output shaft of the rotor is linked to a drive shaft of an air-conditioning compressor and to a crankshaft of an internal combustion engine via belts, a compressor clutch is provided at the drive shaft of the compressor and a crank clutch is provided at the crankshaft so that the fuel supply is cut off to stop the internal combustion engine, the crank clutch is disengaged and the compressor clutch is engaged to drive the compressor with the rotor by electrically operating the rotor in the event that the vehicle stops due to a red signal or the like during operation of the air-conditioning system.

However, if an electrical or mechanical failure occurs in the motor in the vehicle compressor operation control device described above, a traveling engine stop suspends the compressor operation, which poses a problem in that the air-conditioning state deteriorates. In addition, there is a concern that a mechanical failure in the motor adversely affects the rotational load of the traveling engine.

DISCLOSURE OF THE INVENTION

Accordingly an object of the present invention is to provide a drive control device for a hybrid compressor, that is capable of taking appropriate measures in the event of a motor failure in correspondence to the type of motor failure.

In order to achieve the object described above, the present invention provides a hybrid compressor that constitutes part of a refrigerating cycle, includes an engine for traveling and a motor to function as drive sources and is driven by the motor if the traveling engine stops, comprising a motor drive means that supplies power to the motor if a traveling engine stop is indicated and the hybrid compressor operation is to continue, an electrical abnormality judgment means that makes a decision as to whether or not an abnormality has occurred in the power supply to the motor by the motor drive means and a compressor operation continuation means that secures a drive source for the hybrid compressor by allowing the operation of the traveling engine to continue if the electrical abnormality judgment means decides that a power supply abnormality has occurred. In addition, it is desirable that the electrical abnormality judgment means monitor the level of the electrical current flowing in response to a voltage application to the motor and decide that a power supply abnormality has occurred if the value of the electrical current is either extremely low or extremely high.

This structure allows the air-conditioning operation to be performed continuously as the compressor operation continuation means disallows a traveling engine stop to secure a drive source for the hybrid compressor if the electrical abnormality judgment means decides that an abnormality has occurred in the power supply to the motor.

Alternatively, a hybrid compressor according to the present invention that constitutes part of a refrigerating cycle, includes an engine for traveling and a motor to function as drive sources and is driven by the motor if the traveling engine stops, may comprise a motor drive means that supplies power to the motor if a traveling engine stop is indicated and the compressor operation is to continue, a mechanical abnormality judgment means that makes a decision as to whether or not an abnormality has occurred with regard to the motor drive state after the power is supplied to the motor by the motor drive means and an engine protection means that protects the traveling engine by cutting off the connection between the traveling engine and the hybrid compressor if the mechanical abnormality judgment means decides that an abnormality has occurred in the motor drive state. It is desirable that the mechanical abnormality judgment means monitor the rotation rate of the motor following the power supply by the motor drive means and decide that a mechanical abnormality has occurred if the motor rotation rate does not rise to a level equal to or higher than a predetermined rotation rate.

In the structure described above, the connection between the hybrid compressor and the traveling engine is cut off if the mechanical abnormality judgment means decides that the motor drive state is abnormal, thereby protecting the traveling engine from the mechanical abnormality manifesting in the hybrid compressor.

As a further alternative, a hybrid according to the present invention that constitutes part of a refrigerating cycle, includes an engine for traveling and a motor to function as drive sources and is driven by the motor if the traveling engine stops, may comprise a motor drive means that supplies power to the motor if a traveling engine stop is indicated and the hybrid compressor operation is to continue, an electrical abnormality judgment means that makes a decision as to whether or not an abnormality has occurred in the power supply to the motor by the motor drive means, a compressor operation continuation means that secures a drive source for the hybrid compressor by allowing the operation of the traveling engine to continue if the electrical abnormality judgment means decides that a power supply abnormality has occurred, a motor drive means that supplies power to the motor if a traveling engine stop is indicated and the compressor operation is to continue, a mechanical abnormality judgment means that makes a decision as to whether or not an abnormality has occurred with regard to the motor drive state after the power is supplied to the motor by the motor drive means and an engine protection means that protects the traveling engine by cutting off the connection between the traveling engine and the hybrid compressor if the mechanical abnormality judgment means decides that an abnormality has occurred in the motor drive state.

This structure allows the air-conditioning operation to be performed continuously as the compressor operation continuation means disallows a traveling engine stop to secure a drive source for the hybrid compressor if the electrical abnormality judgment means decides that an abnormality has occurred in the power supply to the motor and, protects the traveling engine from the mechanical abnormality manifesting in the hybrid compressor by cutting off the connection between the hybrid compressor and the traveling engine is cut off if the mechanical abnormality judgment means decides that the motor drive state is abnormal.

In addition, it is desirable that the hybrid compressor be provided with a power supply abnormality indicator means that indicates a power supply abnormality if the electrical abnormality judgment means decides that a power supply abnormality has occurred. It is also desirable that the hybrid compressor be provided with a drive abnormality indicator means that indicates a drive state abnormality if the mechanical abnormality judgment means decides that an abnormality has occurred in the motor drive state. These means warn the driver of a motor abnormality and also indicate the type of abnormality as well.

BRIEF DESCRIPTION OF THE DRAWINGS

FIG. 2 presents a flowchart of the hybrid compressor drive control achieved in the embodiment of the present invention.

BEST MODE FOR CARRYING OUT THE INVENTION

Figure 1:
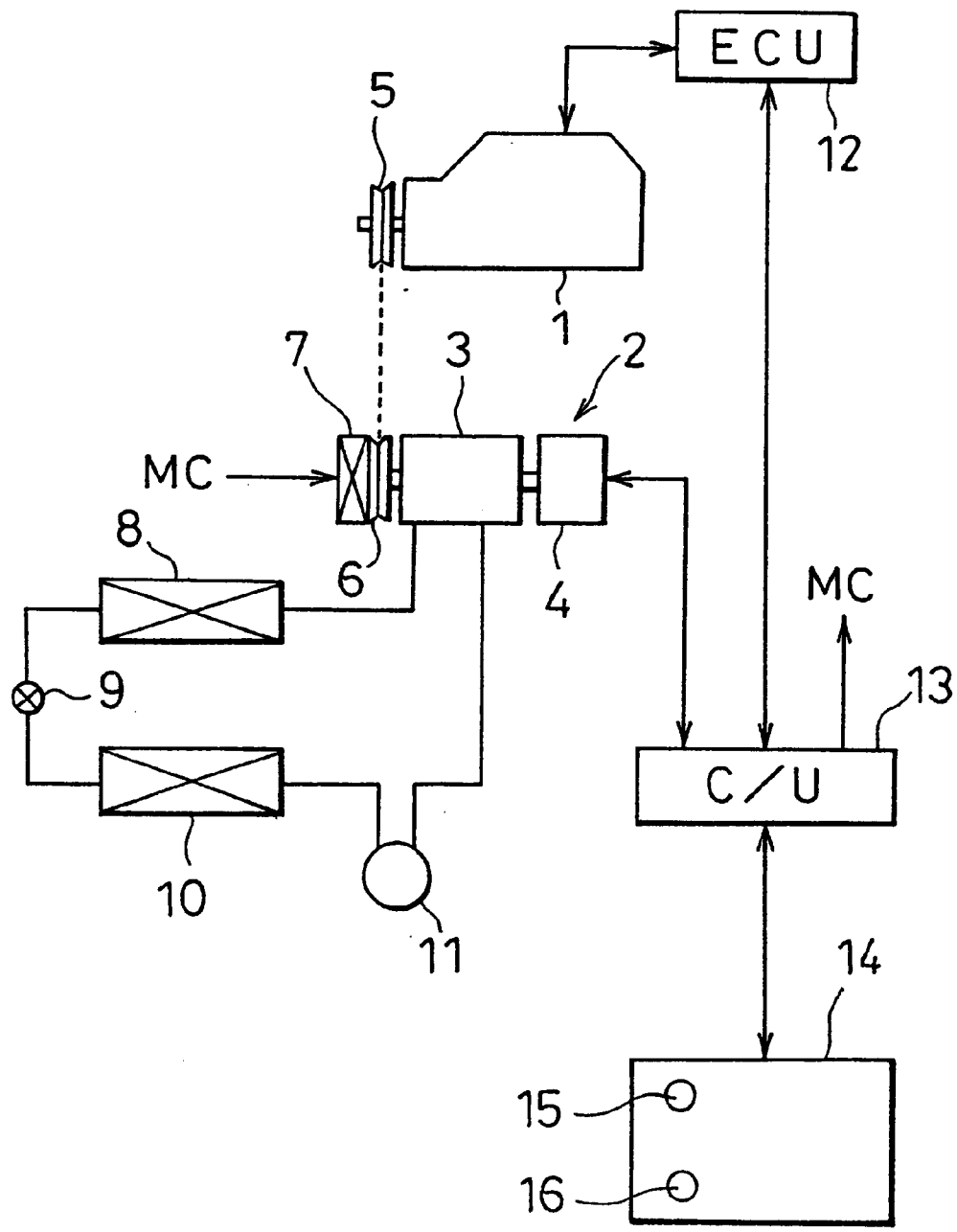
FIG. 1 is a schematic block diagram of a drive control device for a hybrid compressor achieved in an embodiment of the present invention.

The following is an explanation of an embodiment of the present invention, given in reference to the drawings.

As shown in FIG. 1, a hybrid compressor (hereafter referred to as a compressor) 2 includes a compression unit 3 and a motor 4, which is one of the drive sources for driving the compression unit 3. In addition, the compressor 2 includes a belt pulley 6 that is connected to a belt pulley 5 of a traveling engine 1 via a belt and is driven by the traveling engine 1 when it is connected to the belt pulley 6 via an electromagnetic clutch 7.

The compression unit 3 of the compressor 2 constitutes a refrigerating cycle together with, and at least, a heat exchanger 8 for discharge of heat, an expansion valve 9, an evaporator 10 and an accumulator 11, with the evaporator 10 provided inside an air-conditioning duct (not shown) set inside the cabin to cool the air passing inside the air-conditioning duct.

An engine control unit (ECU) 12 is provided to control the traveling engine 1. The traveling engine 1 may be, for instance, a direct injection type engine and the engine control unit 12 cuts off the fuel injection to stop the traveling engine 1 if the operation is switched from engine drive to motor drive in a hybrid car application, for instance, or cuts off the fuel injection to stop the traveling engine 1 as the vehicle comes to a stop in an idle-stop car application.

The engine control unit 12 and a control unit (C/U) 13 that executes air-conditioning control exchange necessary signals for implementing the control described above, and if it is necessary to continuously engage the compressor 2 in operation during air-conditioning control, the electromagnetic clutch 7 is turned off as the traveling engine 1 is stopped and the compression unit 3 of the compressor 2 is continuously engaged in operation by driving the motor 4 to sustain the air-conditioning control.

The engine control unit 12 and the control unit 13 themselves are of the known art, each comprising a central processing unit (CPU), a read only memory (ROM), a random access memory (RAM), an input /output port (I/O) and the like (not shown). It is to be noted that in FIG. 1, reference numeral 14 indicate an operation panel, reference numeral 15 indicates an indicator lamp that indicates a power supply failure and reference numeral 16 indicates an indicator lamp that indicates a disabled motor drive.

The following is an explanation of the compressor drive control executed by the control unit 13 given in reference to the flowchart presented in FIG. 2.

The compressor drive control, which starts in step 100, is executed over specific intervals by branching out from the main control routine of the air-conditioning control. In step 110, a decision is made as to whether or not a request for stopping the traveling engine 1 has been issued. If it is decided that no request for stopping the traveling engine 1 has been issued, the operation proceeds to step 230 to returned to the main control routine.

If, on the other hand, it is decided in step 110 that a request for stopping the traveling engine 1 has been issued, the operation proceeds to step 120 to confirm that the drive of the air-conditioning system (A/C) is to be sustained. If it is decided that the air-conditioning system operation is not to be sustained (N), the operation proceeds to step 220 to output a signal to the engine control unit 12 to stop the traveling engine 1 and then the operation returns to the main control routine from step 230.

If it is decided in step 120 that the air-conditioning system operation is to be sustained (Y), the operation proceeds to step 130 to drive the motor 4 (motor ON) and then in step 140, a decision is made as to whether or not a power supply abnormality has occurred. In more specific terms, a drive voltage is applied (or a drive pulse is output) to the motor 4 and the value of the current Im flowing to the motor 4 is monitored in the control implemented in step 130. As a result, it is possible to decide that a power supply abnormality has occurred due to an insufficient power supply, a disconnection or the like if the current value Im is equal to or lower than a predetermined value $\alpha$, and to decide that a power supplied abnormality has occurred due to a short circuit or the like if the current value Im is equal to or higher than a predetermined Value $\beta$.

If it is decided in step 140 that a power supply abnormality has occurred as described above, the operation proceeds to step 150 to stop the drive voltage application (or the drive pulse output) so as to turn off the motor 4, and then in step 160, a power supply abnormality signal is output to the operation panel 14 to light the indicator lamp. 15, thereby warning the driver that a power supply failure has occurred. Since a continuation of the air-conditioning control is requested although a request for stopping the traveling engine 1 has been issued, the operation proceeds to step 170 to output a signal to the engine control unit 12 so as to sustain the drive of the traveling engine 1 and then the operation returns to the main control routine from step 230. Thus, even when a power supply abnormality has occurred at the motor 4, the traveling engine 1 is not stopped and, consequently, a drive source for the compressor 2 is secured, thereby achieving stable air-conditioning control.

If, on the other hand, it is decided in step 140 that no power supply abnormality has occurred, the operation proceeds to step 180 to make a decision as to whether or not a drive abnormality has occurred in the motor 4. More specifically, it is desirable to monitor the rotation rate Nm of the motor 4 and to make a decision as to whether not the monitored rotation rate Nm is equal to or lower than a predetermined value $\gamma$. As a result, it becomes possible to judge that a motor rotation abnormality has occurred due to an increase in the friction attributable to decentering of the drive shaft, a lock resulting from the liquid compression at the compression unit 3 or the like if the rotation rate Nm of the motor 4 is equal to or lower than the predetermined value $\gamma$.

If it is decided in step 140 that the rotation rate Nm of the motor 4 is higher than the predetermined value, it is assumed that no mechanical abnormality has occurred and the operation proceeds to step 220 to output a signal to the engine control unit 12 so as to stop the traveling engine 1. Thus, it becomes possible to drive the motor 4 in step 130 and to stop the traveling engine 1 in step 220 if a request for stopping the drive of the traveling engine 1 and a request for continuing the air-conditioning control have been issued as long as no electrical abnormality or mechanical abnormality has occurred in the motor 4, thereby achieving a smooth shift of the drive source for the compressor 2, from the traveling engine 1 to the motor 4.

However, if it is decided in step 180 that the rotation rate Nm of the motor 4 is equal to or lower than the predetermined value γ, it is judged that a mechanical abnormality has occurred in the motor 4, and thus, the drive voltage application (or the drive pulse output) to the motor 4 is stopped in step 190 to prevent generation of an abnormal current resulting from a mechanical problem in the motor 4 and then the operation proceeds to step 200 to output a signal to the operation panel 14 so as to light the indicator lamp for indicating a motor drive failure, thereby warning the driver of a motor drive failure.

Next, the operation proceeds to step 210 to output a signal for turning off the electromagnetic clutch 7, thereby disconnecting the traveling engine 1 from the compressor 2, and then the operation proceeds to step 220 to output a signal for stopping the traveling engine 1 to the engine control unit 12 before the operation returns to the main control routine from step 230.

As a result, the connection between the traveling engine 1 and the compressor 2 can be promptly cut off if an abnormality attributable to a mechanical problem at the motor 4 or the compression unit 3 has occurred, which prevents any adverse effect of the mechanical failure on the traveling engine 1. Furthermore, since the signal for turning off the electromagnetic clutch 7 is sustained, it is possible to prevent any adverse effect from manifesting when restarting the traveling engine 1.

INDUSTRIAL APPLICABILITY

As explained above, according to the present invention, the operation of a hybrid compressor can be sustained by continuously engaging the traveling engine operation in the event of an electrical failure in the motor which is one of the drive sources for the hybrid compressor and, as a result, it is possible to continuously implement the air-conditioning control in a stable manner.

In addition, since the connection between the compressor and the traveling engine can be cut off in the event of a mechanical failure in the motor of the hybrid compressor, any adverse affect on the traveling engine can be prevented to achieve a smooth driving operation.

What is claimed is:

1. A hybrid compressor that constitutes part of a refrigerating cycle, includes an engine for traveling and a motor to function as drive sources and is driven by said motor if said traveling engine stops, characterized by comprising:
   a motor drive means that supplies power to said motor if a traveling engine stop is indicated and the operation of said hybrid compressor is to continue;
   an electrical abnormality judgment means that makes a decision as to whether or not an abnormality has manifested in the power supply to said motor by said motor drive means; and
   a compressor operation continuation means that secures a drive source for said hybrid compressor by allowing the operation of said traveling engine to continue if said electrical abnormality judgment means decides that a power supply abnormality has occurred.

2. A drive control device for a hybrid compressor according to claim 1, characterized by further comprising:
   a power supply abnormality indicator means that indicates a power supply abnormality if said electrical abnormality judgment means decides that a power supply abnormality has occurred.

3. A hybrid compressor that constitutes part of a refrigerating cycle, includes an engine for traveling and a motor to function as drive sources and is driven by said motor if said traveling engine stops, characterized by comprising:
   a motor drive means that supplies power to said motor if a traveling engine stop is indicated and the operation of said hybrid compressor is to continue;
   a mechanical abnormality judgment means that makes a decision as to whether or not an abnormality has occurred with regard to the motor drive state after the power is supplied to said motor by said motor drive means; and
   an engine protection means that protects said traveling engine by cutting off the connection between said traveling engine and said hybrid compressor if said mechanical abnormality judgment means decides that an abnormality has occurred in the motor drive state.

4. A drive control device for a hybrid compressor according to claim 3, characterized by further comprising:
   a drive abnormality indicator means that indicates a drive state abnormality if the mechanical abnormality judgment means decides that an abnormality has occurred in the motor drive state.

5. A hybrid compressor that constitutes part of a refrigerating cycle, includes an engine for traveling and a motor to function as drive sources and is driven by said motor if said traveling engine stops, characterized by comprising:
   a motor drive means that supplies power to said motor if a traveling engine stop is indicated and the operation of said hybrid compressor is to continue;
   an electrical abnormality judgment means that makes a decision as to whether or not an abnormality has manifested in the power supply to said motor said motor to drive means;
   a compressor operation continuation means that secures a drive source for said hybrid compressor by allowing the operation of said traveling engine to continue if said electrical abnormality judgment means decides that a power supply abnormality has occurred;
   a motor drive means that supplies power to said motor if a traveling engine stop is indicated and the operation of said hybrid compressor is to continue;
   a mechanical abnormality judgment means that makes a decision as to whether or not an abnormality has occurred with regard to the motor drive state after the power is supplied to said motor by said motor drive means; and
   an engine protection means that protects said traveling engine by cutting off the connection between said traveling engine and said hybrid compressor if said mechanical abnormality judgment means decides that an abnormality has occurred in the motor drive state.

6. A drive control device for a hybrid compressor according to claim 5, characterized by further comprising:
   a power supply abnormality indicator means that indicates a power supply abnormality if said electrical abnormality judgment means decides that a power supply abnormality has occurred.

7. A drive control device for a hybrid compressor according to claim 5, characterized by further comprising:
   a drive abnormality indicator means that indicates a drive state abnormality if the mechanical abnormality judgment means decides that an abnormality has occurred in the motor drive state.

* * * * *